(12) United States Patent
LeBlanc

(10) Patent No.: US 11,692,359 B2
(45) Date of Patent: Jul. 4, 2023

(54) SYSTEMS AND METHODS FOR PRODUCING DURABLE, DIMENSIONALLY STABLE, EXTRUDED SHEET GOODS HAVING A DESIRED SPECIFIC GRAVITY

(71) Applicant: Golconda Holdings, LLC, Bay St. Louis, MS (US)

(72) Inventor: Shane S. LeBlanc, Bay St. Louis, MS (US)

(73) Assignee: Golconda Holdings, LLC, Bay St. Louis, MS (US)

( * ) Notice: Subject to any disclaimer, the term of this patent is extended or adjusted under 35 U.S.C. 154(b) by 243 days.

(21) Appl. No.: 16/732,174

(22) Filed: Dec. 31, 2019

(65) Prior Publication Data

US 2020/0208417 A1    Jul. 2, 2020

Related U.S. Application Data

(60) Provisional application No. 62/787,085, filed on Dec. 31, 2018.

(51) Int. Cl.
| | |
|---|---|
| *B32B 3/10* | (2006.01) |
| *E04F 15/10* | (2006.01) |
| *B32B 7/12* | (2006.01) |
| *E04F 15/08* | (2006.01) |
| *B32B 17/06* | (2006.01) |
| *B32B 27/30* | (2006.01) |
| *B32B 21/02* | (2006.01) |

(52) U.S. Cl.
CPC .............. *E04F 15/107* (2013.01); *B32B 7/12* (2013.01); *E04F 15/085* (2013.01); *B32B 17/066* (2013.01); *B32B 21/02* (2013.01); *B32B 27/304* (2013.01); *B32B 2419/04* (2013.01); *B32B 2471/00* (2013.01)

(58) Field of Classification Search
None
See application file for complete search history.

(56) References Cited

U.S. PATENT DOCUMENTS

| | | | | |
|---|---|---|---|---|
| 2013/0295378 | A1* | 11/2013 | Bonin | ............ C04B 28/06 428/337 |
| 2015/0114552 | A1* | 4/2015 | Cernohous | ............ B29C 43/24 156/242 |
| 2015/0267025 | A1* | 9/2015 | Fang | ............ B32B 3/06 428/318.6 |

(Continued)

FOREIGN PATENT DOCUMENTS

WO    WO-2017121499 A1 *    7/2017    ............ B32B 27/08

*Primary Examiner* — Christopher M Polley
(74) *Attorney, Agent, or Firm* — Kevin T. Duncan; Duncan Galloway Greenwald PLLC

(57) ABSTRACT

The present invention provides a system, method, and apparatus for producing a dimensionally stable extruded board product for use in surface coverings. The board product may be a basalt casting powder-based product for use as a substrate for wall or other surface coverings or may be used as a core layer in a modular floor covering unit. The modular floor covering unit comprises multiple layers. The layers are a thin cut stone veneer layer, a core layer with a density similar to that of the thin cut stone veneer layer, and an optional magnetically receptive underlayment layer. Other layers or combinations of layers may also be used.

24 Claims, 7 Drawing Sheets

130

100

(56) References Cited

U.S. PATENT DOCUMENTS

2017/0298639 A1* 10/2017 Song ..................... B29C 43/003
2018/0127987 A1*  5/2018 Bradway .............. D06N 7/0076
2019/0024384 A1*  1/2019 Van Giel ................. B32B 27/20

* cited by examiner

SYSTEMS AND METHODS FOR PRODUCING DURABLE, DIMENSIONALLY STABLE, EXTRUDED SHEET GOODS HAVING A DESIRED SPECIFIC GRAVITY

CROSS-REFERENCE AND CLAIM OF PRIORITY

The present invention claims the benefit of priority to U.S. Provisional Patent Application 62/787,085, entitled SYSTEMS AND METHODS FOR PRODUCING DURABLE, DIMENSIONALLY STABLE, EXTRUDED SHEET GOODS HAVING A DESIRED SPECIFIC GRAVITY, by LeBlanc, filed Dec. 31, 2018, which is incorporated by reference herein in its entirety.

FIELD OF THE INVENTION

The present invention pertains to surface coverings including wallboards. More particularly, the present invention relates to systems and methods for producing dimensionally stable wall boards and flooring cores for use in magnetically secured and traditional surface covering systems.

BACKGROUND

In the field of wall coverings, the process of constructing wall coverings is time consuming, expensive, and messy. In typical residential and commercial buildings, a frame is erected for interior walls. On this frame a set of gypsum, sheetrock, or drywall boards are typically hung. These drywall boards are attached with screws or nails to the frame, which may be metal or wood. The boards must then be finished prior to painting. The finishing process for drywall boards typically involves mudding and taping. Mudding involves applying a wet-mix compound to mesh or paper tape that has been applied to the seams of the drywall board. The seams and edges must then be sanded prior to finishing. The finishing of drywall boards typically involves priming the surface with a primer type paint and then painting on the final wall cover on the primed surface. This process creates particulate dust contaminants that are difficult to clean and control. The process also may create an undesirable chemical smell due to volatile organic compounds ("VOCs") present in the paint, primer, and drywall boards.

Other methods of finishing a wall include: using wood boards or panels including "ship-lap" style panels; applying stone, masonry, or brick; applying wall-paper using glue and a decorated paper roll; applying wall trim pieces; and securing thin wooden boards and applying a plaster coating. For any of these methods, it may also be desirable to insulate the wall by placing an insulation layer for thermal or acoustic insulation behind the finished wall. Insulating is an additional step that must be completed prior to finishing the wall and may be time consuming and messy.

For all of the above-mentioned methods, replacing the covering may be difficult and time consuming. Replacing a masonry wall covering, for example, requires extensive demolitions and clean-up. Replacing wall-paper may require replacing the drywall board the paper is secured to. Many of the above methods require destructive removal to replace.

Existing systems for producing wall boards include wall boards made from mineral or rock wool which provides an improvement over existing drywall or gypsum wall boards. Gypsum, known as calcium sulfate dihydrate, is a rock-based product used in "drywall" wallboards. The Gypsum Association article "What is Gypsum?" at https://www.gypsum.org/about/gypsum-101/what-is-gypsum/ (accessed Dec. 27, 2019) describes the processes of obtaining and processing natural and synthetic gypsum and is incorporated by reference herein in its entirety. Drywall is an imperfect product. In construction, a mandated fire rating must be met for local and municipal codes, sound absorption must be provided, and the drywall must be properly finished. Drywall must do all of these things and be the finished layer in a finished wall. In high rise construction, currently wall construction cannot begin until the building has been hung with exterior glass, cladding, or cast materials. This is because the gypsum drywall has a paper layer that is organic in nature. In a building system, moisture may become trapped under the floor covering and permeate the walls. The gypsum absorbs the moisture and the absorbed moisture may cause mold growth. If a building were to have a water pipe break or otherwise be subject to water damage, mold may grow on the walls within hours. Furthermore, dehumidifiers and/or heaters must be brought into the building process for gypsum walls in the winter/summer provide for the conditions that eliminate mold growth and enable the gypsum drywall seaming to dry in an acceptable time frame. Rock wool or mineral wool-based wall boards have drawbacks as well. These boards may be expensive or difficult to produce and may not comprise some of the desirable characteristics of gypsum-based wall boards. Mineral wool may be made from a spun basalt fiber or strand derived from basalt rock. A description of basalt powder and basalt fiber is provided in the Reade Int'l Corp. article "Basalt Rock, Basalt Powder & Basalt Fiber/Strand" found at https://www.reade.com/products/basalt-rock-basalt-powder-basalt-fiber-strand (accessed Dec. 27, 2019) and is incorporated by reference herein in its entirety.

Existing systems and methods for modularly securing surface coverings to supporting surfaces, such as walls and floors, include MODULAR MAGNETIC WOOD AND ENGINEERED WOOD FLOORING UNITS UTILIZING A MAGNET BOX SYSTEM FOR FLOORS, WALLS, AND OTHER SURFACES, by LeBlanc et al., U.S. application Ser. No. 16/013,902, filed Jun. 20, 2018; MODULAR MAGNETIC WOOD AND ENGINEERED WOOD FLOORING UNITS UTILIZING A MAGNET BOX SYSTEM FOR FLOORS, WALLS, AND OTHER SURFACES, by LeBlanc et al., U.S. Provisional Application No. 62/522,513, filed Jun. 20, 2017; SYSTEM AND METHOD FOR PRODUCING A RUST-RESISTANT AND DIMENSIONALLY STABLE MAGNETICALLY RECEPTIVE SHEET GOOD FOR USE IN SURFACE COVERING SYSTEMS, by LeBlanc et al., U.S. Provisional Patent Application No. 62/650,228, filed Mar. 29, 2018; SYSTEM, METHOD, AND APPARATUS FOR MAGNETIC SURFACE COVERINGS, by Lautzenhiser et al., U.S. application Ser. No. 15/083,231, filed Mar. 28, 2016; SYSTEM, METHOD, AND APPARATUS FOR MAGNETIC SURFACE COVERINGS, by Lautzenhiser et al., U.S. application Ser. No. 15/083,225; U.S. Provisional Patent App. No. 62/139,226, entitled SYSTEM, METHOD, AND APPARATUS FOR THE MANUFACTURE AND INSTALLATION OF MAGNETIC FLOOR COVERING UNITS AND MAGNETIC UNDERLAYS, by Lautzenhiser et al., filed Mar. 27, 2015; and U.S. Provisional Patent App. No. 62/258,432, entitled SYSTEM AND METHOD FOR MAGNETIC WALL COVERING UNITS AND MAGNETIC UNDERLAYS, by Lautzenhiser et al., filed Nov. 21, 2015, all of which are incorporated by reference herein in their entirety.

Specifically, with respect to floor coverings, many modular type floor covering systems comprise floor covering units having a laminated type construction. Typically, these floor covering units have a top layer or wear layer, one or more core layers, and a bottom layer. The top layer is typically made from wood, engineered wood, or a type of polymer or vinyl. The core layer is typically made of one or more polymer or polymer blend layers. Materials such as sawdust may be blended in with a polymer and/or elastomer mixture to form the core layers. The bottom layer is typically an underlayment layer and may be a magnetically receptive layer as described in the U.S. patent application Ser. No. 16/013,902 application.

However, existing floor coverings are limited in the types of materials that may be used for the top layer and core layers. Materials such as thin cut or veneer cut stone are not suitable for use in the top layer on a floor covering unit with existing core layers. If a thin cut stone veneer layer were used with the core layers of the prior art, the thin cut stone veneer layer would crack or break under mild shocks or impacts. The density and composition of existing core layers is unsuitable for use with the relatively brittle and easily fractured thin cut stone veneer layers.

What is needed is a system and method for producing and installing wall boards and floor covering units that is compatible with a wide range of floor covering material and supporting surface types and compositions. Additionally, what is needed is a system and method for producing a modular floor covering unit with a core layer composition that is suitable for use with a thin cut stone veneer top layer.

SUMMARY OF THE INVENTION

The present invention provides a system, apparatus, and method for manufacturing extruded boards for use as surface coverings and floor covering core layers. In a first implementation, the present invention provides a basalt casting powder-based wall board that is produced in an extrusion manufacturing process. A description of the properties of the basalt casting powder of the present invention can be found in Appendix A to the specification. In a second implementation, a similar manufacturing process and raw material composition may be used to produce a stone dust-based shock absorbing core layer for use in floor covering units to make a lightweight stone/hybrid (SAS—shock absorbing stone) floor covering unit. Optionally, the present invention may implement magnetically receptive layers and magnetic underlayments for use in an interchangeable box system for attaching surface covering units to supporting surfaces.

There are drawbacks to existing gypsum and mineral wool wallboards with respect to the physical properties and manufacturing processes of both. The present invention uses a basalt casting powder to provide a wallboard that comprises improved physical characteristics compared with traditional wallboards. The basalt casting powder wallboard of the present invention comprises improved qualities as a substrate compared to gypsum and mineral wood wallboards, with certain qualities that are more desirable in a construct product.

The vast majority of drywall/sheetrock used in construction is made from gypsum and requires a paper (organic) front and backing and is susceptible to water damage. A lesser used material is mineral wool-based wallboards which are typically made from basalt fiber (and not from basalt casting powder). Although basalt comprises many desirable properties when used in a wallboard, the fibers used in a mineral wool wallboard are not an ideal construction material. The present invention uses a mixture of basalt casting powder as its primary material or core component and also includes, calcium carbonate (as a filler), foaming agents, and resins.

Basalt casting powder comprises many properties and advantages that make it a more desirable material for use in a wallboard than either gypsum or (basalt fiber-based, spun) mineral wool. First, basalt casting powder has high porosity. Since it has high porosity, it dampens sound and refraction of sound significantly. This is significant as the dampening of sound from one structure to another is desirable in a multi-unit structure (e.g., condominium, duplex, townhouse, office buildings) and from one floor to another within a structure. Basalt casting powder is hard. Basalt casting powder is harder than steel or magnesium steel with only diamond or a composite carbon fiber having a higher Shore hardness. Basalt casting powder is water insoluble and acid insoluble. Basalt casting powder is second only to diamond in withstanding abrasion and wear. Basalt casting powder originates from igneous, or lava rock, and holds up to thousands of degrees Celsius. Basalt casting powder enables wallboard products to be extruded (not spun) without the need for organic-based front/back paper sheeting.

Basalt casting powder's main uses are in casting pipe and valves industrially because a basalt cast pipe or valve has properties for industrial uses that hold up over time. While basalt casting powder is primarily used industrially in casting pipes and valves, it has found use in some other construction materials with the refining of its Mesh size and with Melt Spun Sintering Technology advancements in the last few years. Basalt casting powder costs $100 USD to $500 USD per ton depending on its Mesh size and is a significantly cheaper building material with better physical properties than traditional wall boards that use organic materials that are susceptible to mold as organic compounds. Basalt casting powder is not as susceptible to mold as it is an inorganic compound.

The process used to produce the wallboard may also be used to produce a core layer board product for use in modular floor covering units. One difference between a basalt casting powder wallboard product according to the present invention and a shock absorbing core layer board product is that the shock absorbing core layer board product may comprise stone dust rather than the basalt casting powder, but is manufactured in a similar manner. A floor covering unit using the shock absorbing core layer board product would be a laminated or "sandwiched" product comprising a natural thin cut veneer stone or ceramic top or wear layer, a shock absorbing core layer made from a stone dust or limestone, polymer, and foaming agents—the core layer board product of the present invention, and a magnetically receptive (also known as a SCRM—system component receptive material) layer. The receptive layer and the SCRM layer are optional and not required for the manufacture of the laminated floor covering unit with a thin cut stone veneer top layer and a shock absorbing core layer of the present invention. In a magnetic flooring system, the SCRM-based floor covering unit is positioned opposite a magnetized underlayment disposed on a floor substrate or supporting layer. Alternatively, the underlayment may be SCRM-based and the laminated floor covering unit may be magnetized. The solution may be isotropic or anisotropic.

The shock absorbing core layer of the present invention is a substantial improvement over existing core layer board or sheet good products.

Natural marble, granite, and other stone products used in flooring as floor coverings are typically at least 2 cm thick because they are a porous in nature and must be thick to absorb shocks, so they do not crack. The present invention comprises a thin cut stone veneer layer that is ⅛ of inch or less in thickness and which is glued and/or pressed or otherwise joined onto the shock absorbing core layer. By using only a thin cut stone veneer layer instead of a 2 cm thick stone layer the overall price of the floor covering unit is reduced by as much as 50% compared to a floor covering product comprised only of a thick cut stone. Another benefit of the shock absorbing core layer is that drastically reduces the shipping weight and raw material usage compared to a floor covering product comprised only of a thick cut stone. One primary benefit in combining the thin cut stone veneer with the shock absorbing core layer is that the core layer has shock absorbing properties and the complete product comprised of the thin cut stone veneer and shock absorbing core layer is highly resistant to cracking.

The specific gravity of the shock absorbing core layer, or the combination of the shock absorbing core layer and magnetically receptive layer, is closely matched to the specific gravity of the thin cut stone veneer. The specific gravity of each layer—the density of each layer relative to a baseline material—in a relative equilibrium. The close matching of the specific gravities of the shock absorbing core layer and the thin cut stone veneer prevents cracking and damage to the thin cut stone veneer through wear, impacts, and shocks. Common densities of materials can be found in the ThoughtCo. article "Densities of Common Rocks and Minerals" at https://www.thoughtco.com/densities-of-common-rocks-and-minerals-1439119 (accessed Dec. 27, 2019), which is incorporated by reference herein in its entirety.

By using cementitious materials, a lightweight stone/hybrid floor covering material comprised of the thin cut stone veneer layer and the shock absorbing core layer can be installed using conventional methods. As described above, the floor covering material may be used with a SCRM layer so that it may be quasi-permanently installed (e.g., opposite a magnetic underlayment) and will require no abatement when being removed when installed as part of an interchangeable magnetic box system. The lightweight stone/hybrid floor covering material comprised of the thin cut stone veneer layer and the shock absorbing core layer improves over existing pre-made core material that is prevalent in "core" flooring currently.

In one embodiment, the present invention provides an extruded, dimensionally stable board product comprising: a primary material; a filler material; a foaming agent; a stabilizer; and a binding material. The primary material may be basalt casting powder. The primary material may be stone dust. The board product may be formed by: mixing the primary material, the filler material, the foaming agent, the stabilizer, and the binding material in a high speed and high temperature mixer to form a mixture; cooling the mixture in a cooling pan; extruding the mixture to form an extruded product; setting the extruded product in a setting machine; pulling the set extruded product in a traction machine to pull out the extruded product to a desired length and thickness; cutting the set and pulled extruded product into a desired final size to form a final board product; resting the final board product; and curing the final board product in a furnace. The board product may have a specific gravity of 2.0-4.0.

The board product may further comprise at least 45% of the binding material; at least 15% of the filler material; at least 30% of the primary material; at least 0.5% of the foaming agent; and at least 2% of the stabilizer. The binding material in the board product may further comprise at least 30% of a first binding material; and at least 15% of a second binding material. The board product may further comprise at least 4% of a foaming agent regulator. The board product may comprise at least 0.5% of a lubricant. The primary material of the board product may further comprise: a first primary material having a first mesh size; and a second primary material having a second mesh size.

In another embodiment, the present invention provides a lightweight hybrid floor covering unit, the floor covering unit comprising: a thin cut stone veneer top layer; and a shock absorbing core layer having a specific gravity in equilibrium with the thin cut stone veneer top layer. The shock absorbing core layer may be a dimensionally stable board product comprising: a primary material; a filler material; a foaming agent; a stabilizer; and a binding material. The primary material may be stone dust. The floor covering unit may further comprise an underlayment layer. The underlayment layer may be a magnetically receptive sheet good. The specific gravity of the underlayment layer and the shock absorbing core layer may be in equilibrium with the thin cut stone veneer top layer. The underlayment layer may have a specific gravity higher than the specific gravity of the shock absorbing core layer. The thin cut stone veneer top layer may be pressed to the shock absorbing core layer and may be secured by an adhesive. The shock absorbing core layer may be pressed to the underlayment layer and may be secured by an adhesive. The floor covering unit may further comprise: wherein the thin cut stone veneer top layer has a specific gravity of 2.0-3.0; and wherein the shock absorbing core layer has a specific gravity of 2.0-4.0. The floor covering unit may further comprise: wherein the thin cut stone veneer top layer has a specific gravity of 2.0-3.0; and wherein the shock absorbing core layer and the underlayment layer have a specific gravity of 2.0-4.0, with the underlayment layer having a relatively higher specific gravity than the shock absorbing core layer. The floor covering unit may further comprise a magnetized sheet good layer, and the specific gravity of the magnetized sheet good layer and the shock absorbing core layer may be in equilibrium with the thin cut stone veneer top layer. The floor covering unit may further comprise wherein the dimensionally stable board product further comprises: at least 45% of the binding material; at least 15% of the filler material; at least 30% of the primary material; at least 0.5% of the foaming agent; and at least 2% of the stabilizer. The dimensionally stable board product may further comprise: the binding material comprising: at least 30% of a first binding material; and at least 15% of a second binding material. The dimensionally stable board product may further comprise at least 4% of a foaming agent regulator. The dimensionally stable board product may further comprise at least 0.5% of a lubricant. The primary material of the dimensionally stable board product may further comprise: a first primary material having a first mesh size; and a second primary material having a second mesh size.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
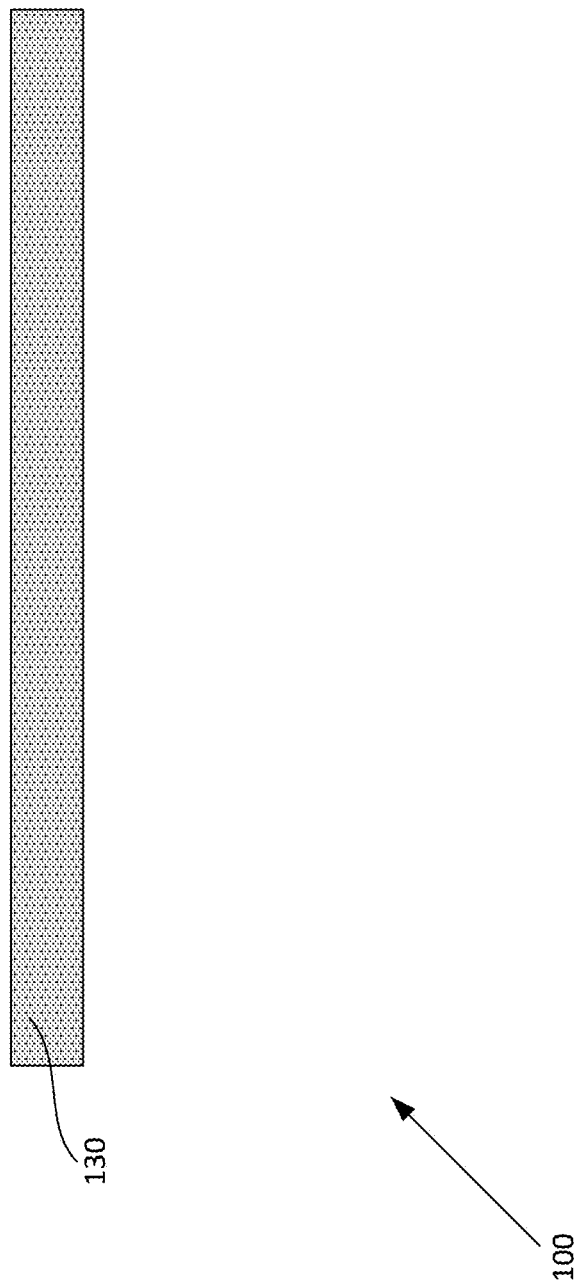
FIGS. 1 and 2 provide respective side cross-section and top perspective views of an embodiment of a basalt casting powder wallboard according to the present invention.
Figure 2:
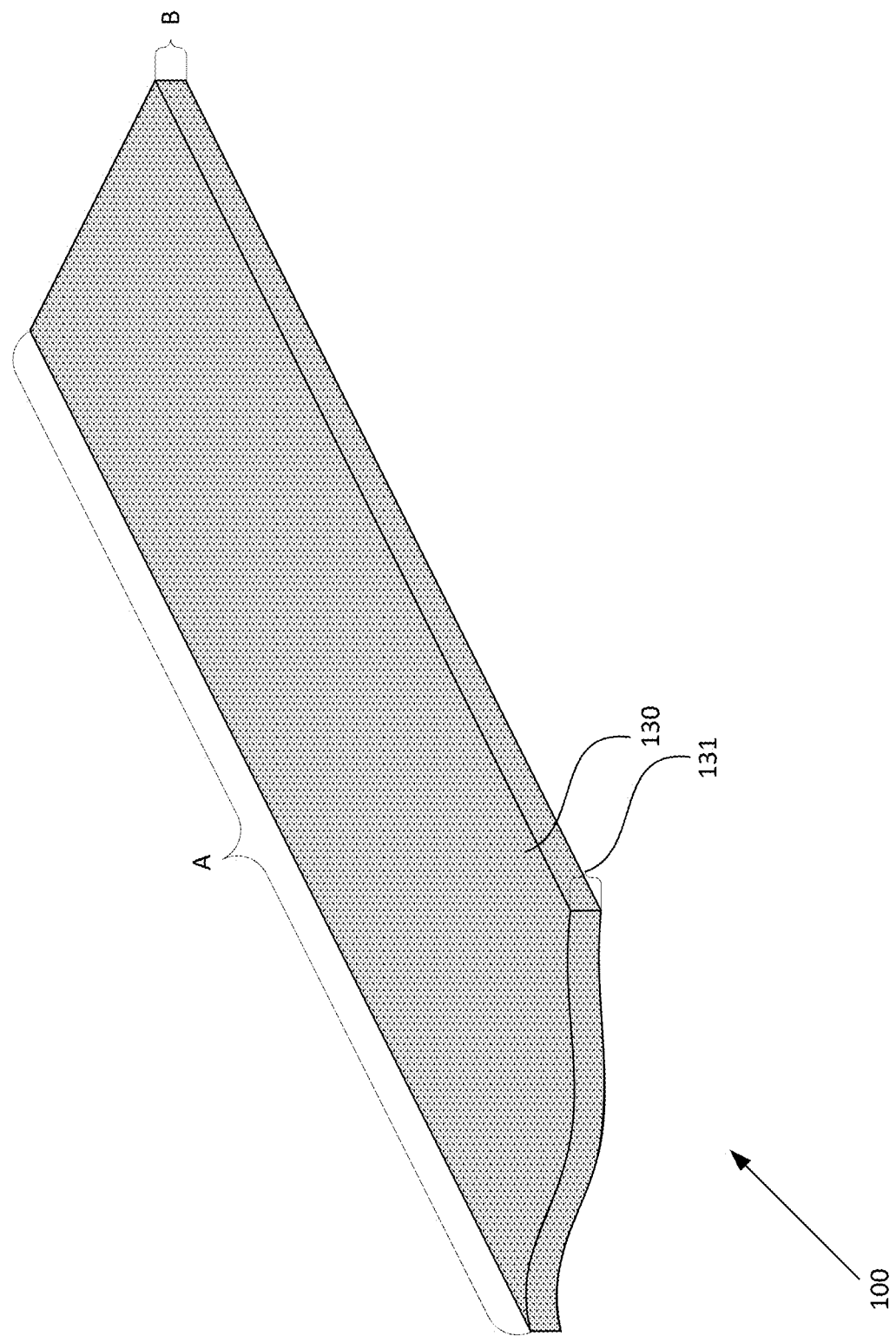
Figure 3:
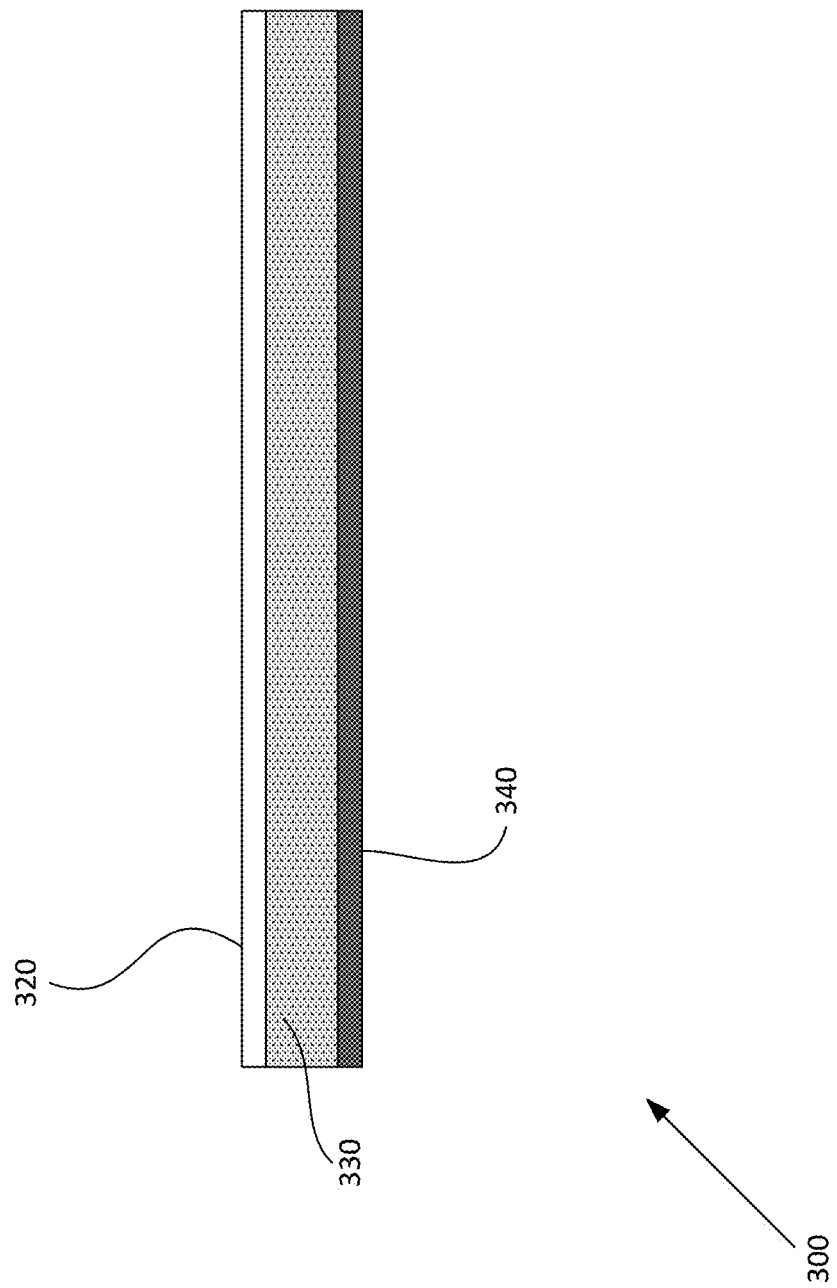
FIGS. 3 and 4 provide respective side cross-section and top perspective views of an embodiment of a lightweight stone/hybrid floor covering with a thin cut stone veneer top layer, a shock absorbing core layer, and an underlayment layer according to the present invention.
Figure 4:
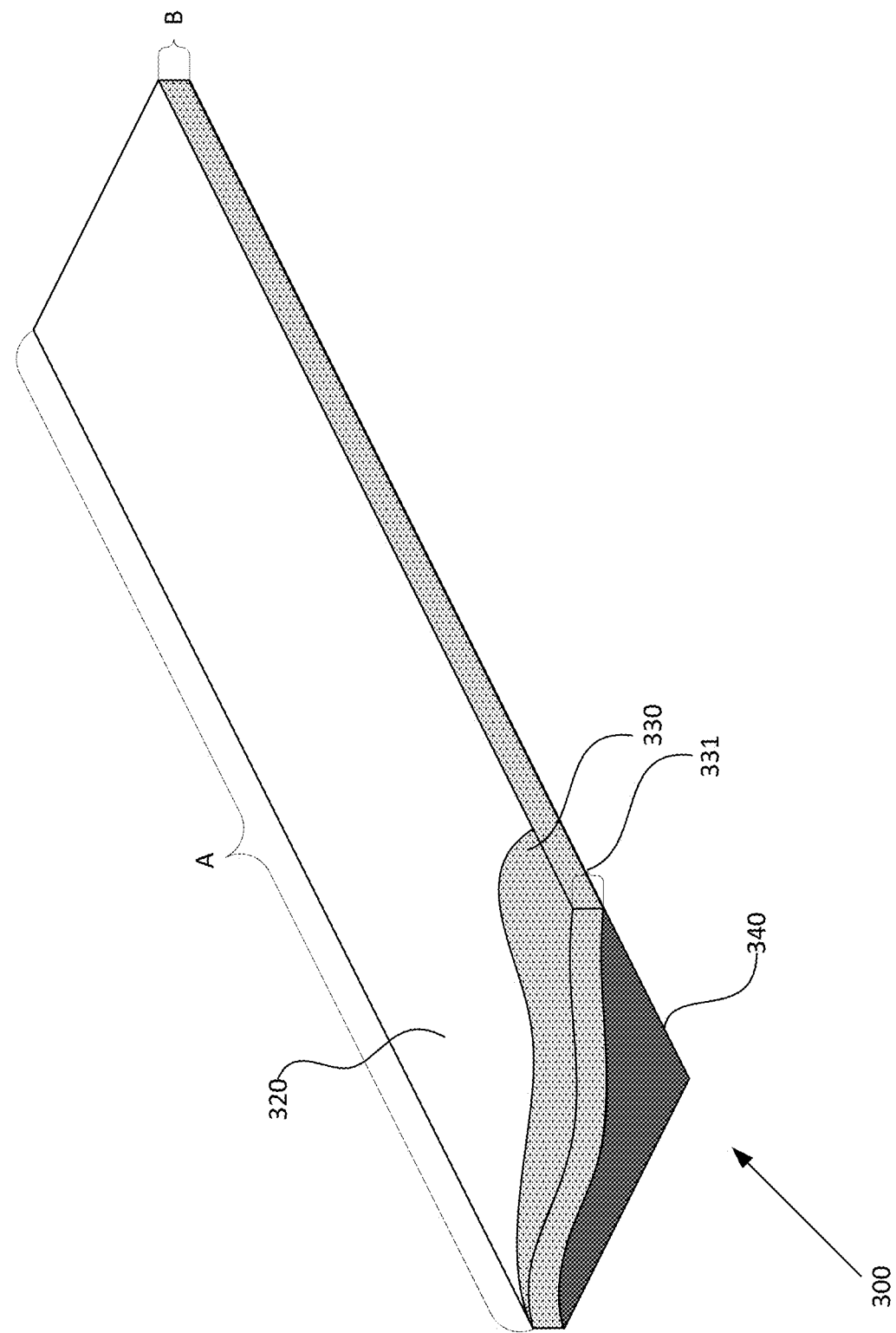
Figure 5:
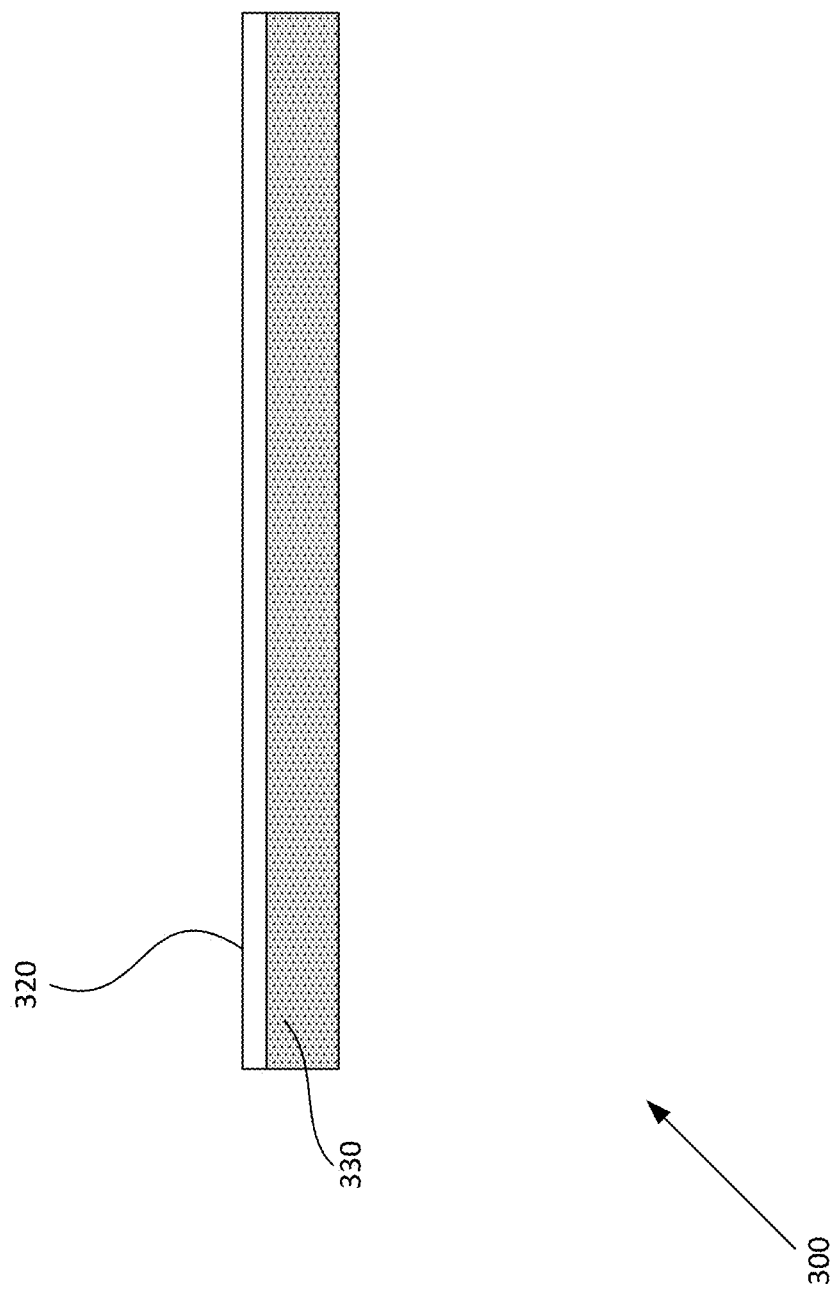
FIGS. 5 and 6 provide respective side cross-section and top perspective views of an embodiment of a lightweight stone/hybrid floor covering with a thin cut stone veneer top layer and a shock absorbing core layer according to the present invention.
Figure 6:
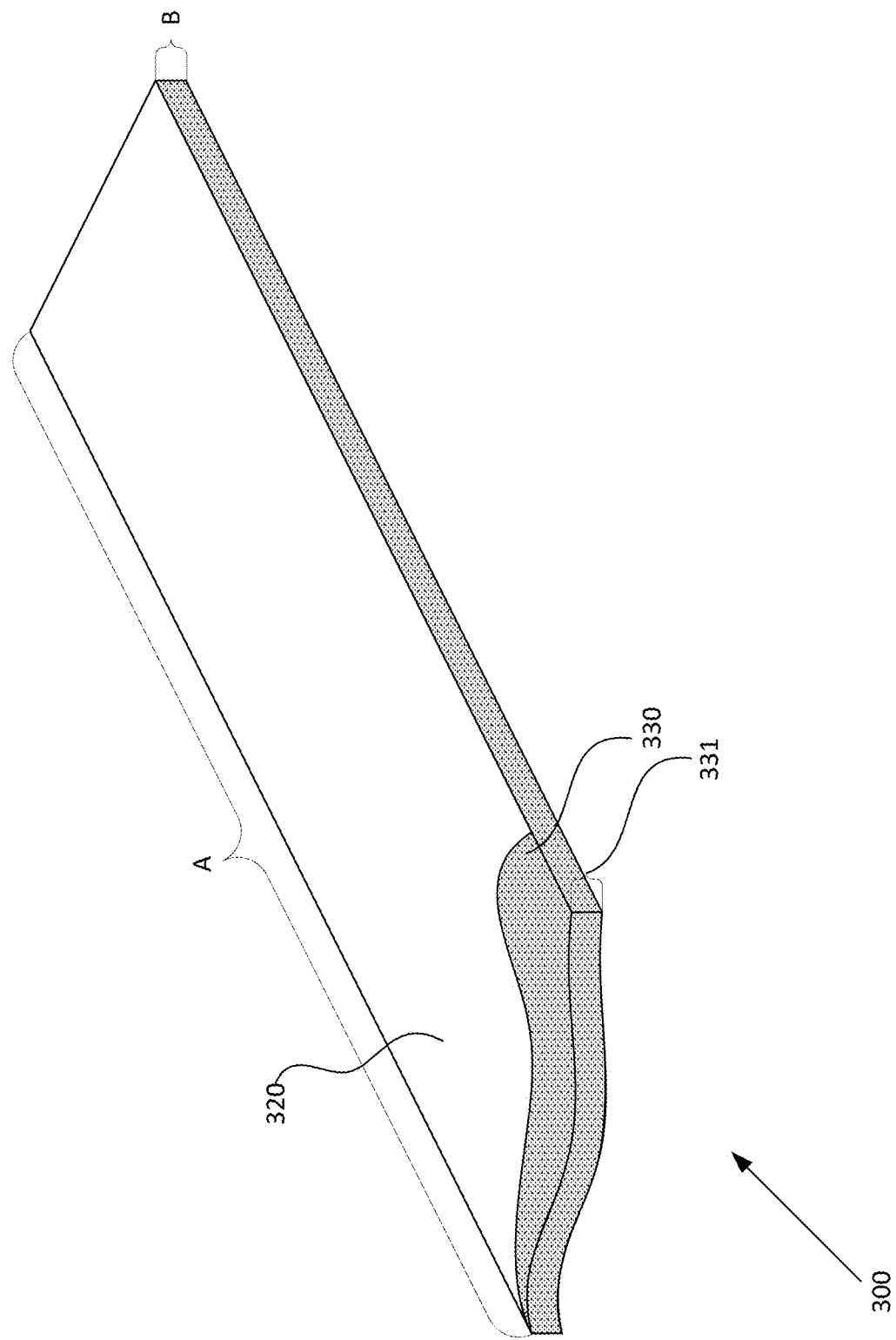

Basalt Casting Powder Wallboard:

With respect to FIGS. 1 and 2, respective side cross-cross section and perspective views of a wallboard 100 with a basalt casting powder core 130 with a thickness 131 is provided. The wallboard 100 is produced using an extrusion process shown in FIG. 7 and may be comprised of the materials provided in Tables 1-5 below. The primary material or main component of the wallboard 100 is basalt casting powder. Basalt casting powder as a primary material provides an improvement over the prior art gypsum-based drywall boards and rock or mineral wool boards. The basalt casting powder wallboard 100 of the present invention is more dimensionally stable, easier to manufacture, and possesses more desirable qualities as a construction material than either gypsum-based drywall or mineral wood wallboard.

The following Tables 1-5 provide mixtures for both basalt casting powder and a wallboard mixture comprising basalt casting powder.

TABLE 1

Basalt Casting Powder - Density: 740 kg/m^3 - Compression strength: 5.78 mpa
Chemical Composition

| Chemical Compound | Percent by Weight |
|---|---|
| SiO2 | 43.27% |
| CaO | 9.86% |
| MgO | 1.49% |
| Fe2O3 | 11.86% |
| Al2O3 | 14.71% |

TABLE 2

| Chemical | Description | Formula | IUPAC ID | Molar Mass | Melting Point | Density | Boiling Point |
|---|---|---|---|---|---|---|---|
| Silicon Dioxide | Also known as silica, is a chemical compound that is an oxide of silicon with the chemical formula SiO$_2$. | SiO2 | Silicon dioxide | 60.08 g/mol | 3,110° F. (1,710° C.) | 2.65 g/cm$^3$ | 4,046° F. (2,230° C.) |
| Calcium Oxide | It is a white, caustic, alkaline, crystalline solid at room temperature. | CaO | Calcium oxide | 56.0774 g/mol | 4,662° F. (2,572° C.) | 3.35 g/cm$^3$ | 5,162° F. (2,850° C.) |
| Magnesium Oxide | A white hygroscopic solid mineral that occurs naturally as periclase and is a source of magnesium. | MgO | Magnesium oxide | 40.3044 g/mol | 5,166° F. (2,852° C.) | 3.58 g/cm$^3$ | 6,512° F. (3,600° C.) |
| Iron Oxide (iii) | Inorganic compound with the formula Fe2O3. Fe2O3 is ferromagnetic and dark red. | Fe2O3 | Iron Oxide (iii) | | 2,849° F. (1,565° C.) | 5.242 g/cm$^3$ | |
| Aluminum Oxide | Al2O3 is used to produce aluminum metal, as an abrasive owing to its hardness, and as a refractory material owing to its high melting point. | Al2O3 | Aluminum (iii) Oxide | | 3,762° F. (2,072° C.) | 3.95-4.1 g/cm$^3$ | |

TABLE 3

Formula 1

| Material | Amount by Weight |
|---|---|
| Resin Powder | 75 kg |
| Light Calcium Carbonate | 25 kg |
| Basalt Casting Powder at 200 mesh | 25 kg |
| Basalt Casting Powder at 600-800 mesh | 25 kg |
| AC Yellow Foaming Agent | 0.3 kg |
| NC White Foaming Agent | 0.7 kg |
| Foam Regulator | 7 kg |

TABLE 3-continued

Formula 1

| Material | Amount by Weight |
| --- | --- |
| Calcium Zinc Stabilizer | 4 kg |
| External Lubricant - PE Wax | 0.3 kg |
| Internal Lubricant - G6 | 0.6 kg |
| 316 OPE Wax (Oxidized Polyethylene Wax) | 0.3 kg |

TABLE 4

Formula 2

| Material | Amount by Weight |
| --- | --- |
| PVC Powder | 50 kg |
| Resin Powder | 25 kg |
| Light Calcium Carbonate | 25 kg |
| Basalt Casting Powder at 200 mesh | 25 kg |
| Basalt Casting Powder at 600-800 mesh | 25 kg |
| AC Yellow Foaming Agent | 0.3 kg |
| NC White Foaming Agent | 0.7 kg |
| Foam Regulator | 7 kg |
| Calcium Zinc Stabilizer | 4 kg |
| External Lubricant - PE Wax | 0.3 kg |
| Internal Lubricant - G6 | 0.6 kg |
| 316 OPE Wax (Oxidized Polyethylene Wax) | 0.3 kg |

TABLE 5

Formula 3

| Material | Amount by Weight |
| --- | --- |
| PVC Powder | 75 kg |
| Light Calcium Carbonate | 25 kg |
| Basalt Casting Powder at 200 mesh | 25 kg |
| Basalt Casting Powder at 600-800 mesh | 25 kg |
| AC Yellow Foaming Agent | 0.3 kg |
| NC White Foaming Agent | 0.7 kg |
| Foam Regulator | 7 kg |
| Calcium Zinc Stabilizer | 4 kg |
| External Lubricant - PE Wax | 0.3 kg |
| Internal Lubricant - G6 | 0.6 kg |
| 316 OPE Wax (Oxidized Polyethylene Wax) | 0.3 kg |

Formula 1, shown in Table 3, provides a similar rigidity compared with traditional gypsum sheetrock/drywall products and has a density of approximately 1.0 g/cm3. Each of the formulas comprises a binding agent or material (e.g., resin powder, PVC powder), a filler material (e.g., calcium carbonate), a primary material (e.g., basalt casting powder at one or more mesh sizes), a foaming agent (e.g., AC yellow foaming agent, NC white foaming agent), and a stabilizer (e.g., calcium zinc stabilizer). The formulas may also comprise internal and external lubricants and other materials as required. Using a plurality of Mesh sizes for the basalt casting powder as the primary material provides for increased dimensional stability, promotes bonding, and provides increased structural rigidity than when using only a single Mesh size basalt casting powder. The ratios of the basalt casting powder in a plurality of mesh sizes, such as a higher and lower mesh size that are both relatively fine, with the fillers, binding material, foaming agents, stabilizers, and lubricants is important to achieving a fully bonded, dimensionally stable wallboard 100.

Basalt casting powder as the primary material in the wallboard 100 is an improvement over traditional wallboard materials in part because of the improved physical characteristics of basalt casting powder compared to organic materials. Basalt casting powder has a high porosity. Since basalt casting powder has high porosity, it dampens sound and refracts sound significantly. This is very important in urban condominiums, townhomes, and apartments where sound dampening from one housing unit to another is critical. This is equally important and beneficial in office settings where sound abatement is important for confidentiality and to avoid distractive ambient sounds, e.g., office mates chatter, conference rooms, phone conferences, etc. Stone and ceramic flooring products currently see limited use in these installation conditions because the flooring units do not absorb sound but refract sound and have the worst sound ratings of any flooring unit. A flooring unit with a shock absorbing core, as shown in FIGS. 3-6 and described hereinbelow, addresses these deficiencies.

Basalt is a neovolcanic eruptive rock which melts at approximately 1250° C. and can be cast in a similar way to cast iron. To produce basalt casting powder, basalt gravel of a desired chemical and mineralogical structure is melted in a furnace similar to an open-hearth furnace. The molten magma flows through a homogenizing drum and is cast by means of casting ladles—like cast iron—into sand molds or chill molds (static cast) or in rotating chill molds (dynamic or centrifugal casting). After a carefully controlled annealing process the resultant cast material, "cast basalt" comprises the characteristics shown in Table 6.

TABLE 6

Elementary Qualities of Cast Basalt:

| | |
| --- | --- |
| Specific gravity | 2.90-3.0 g/cm3 |
| Compressive Strength | approx. 450 MPa-min |
| Bending Strength | approx. 40 MPa-min |
| Tensile Strength | approx. 10 MPa-min |
| Abrasion Resistance | 3-3.5 cm3/50 cm2 - Din 52 108 |
| Hardness | 8.5 Mohs scale |

Another advantage of cast basalt products, such as basalt casting powder, is that they comprise a relatively high abrasion resistance which may be greater than some alloyed steels. Moreover, basalt castings have a relatively high durability and are resistant to most acids and lyes, even in relatively high concentrations. As wallboards and flooring units are subjected to harsh chemicals due to cleaning and other uses, this is a key advantage over other materials.

Basalt casting powder is also water insoluble and acid insoluble. Gypsum-based wall boards and gypsum-based construction materials are comprised of organic compounds and are susceptible to water damage and to developing mold and fungal growths, including toxic molds, when exposed to water or standing water. Organic compound-based boards such as gypsum may grow mold in as little as 12 hours. In the case of gypsum wallboard, a paper product is used to hold the gypsum together and is organic. Mold growths feed off organic compounds and moisture. Basalt casting powder and the wallboard 100 does not comprise organic compounds and is relatively impervious to moisture thereby proving an advantage for building materials compared to those comprising organic compounds. This anti-mold or mold resistant property is particularly beneficial in applications prone to flooding (e.g., coastal/river basin areas) or water leaking (e.g., basements, bathrooms, kitchens). Use of the improved wall board can help mitigate costs associated with repairs/replacement in flood/leak-prone areas. Insurance providers may offer discounts to insureds having properties that use these damage resistant materials.

Using basalt casting powder as the primary material in wallboard/cores, such as the wallboard 100, provides for the finished wallboard/core to possess properties that other organic compound comprising building materials lack. For example, basalt is a form of lava rock and basalt casting powder-based wallboard 100 has a melting point that is at least twice as high as a gypsum-based wallboard. This is advantageous in fire situations in buildings. As stated above, basalt casting powder-based wallboard 100 is relatively impervious to acids and lye, mold, and has insulating properties—all of which are desired properties in a building material.

Figure 7:
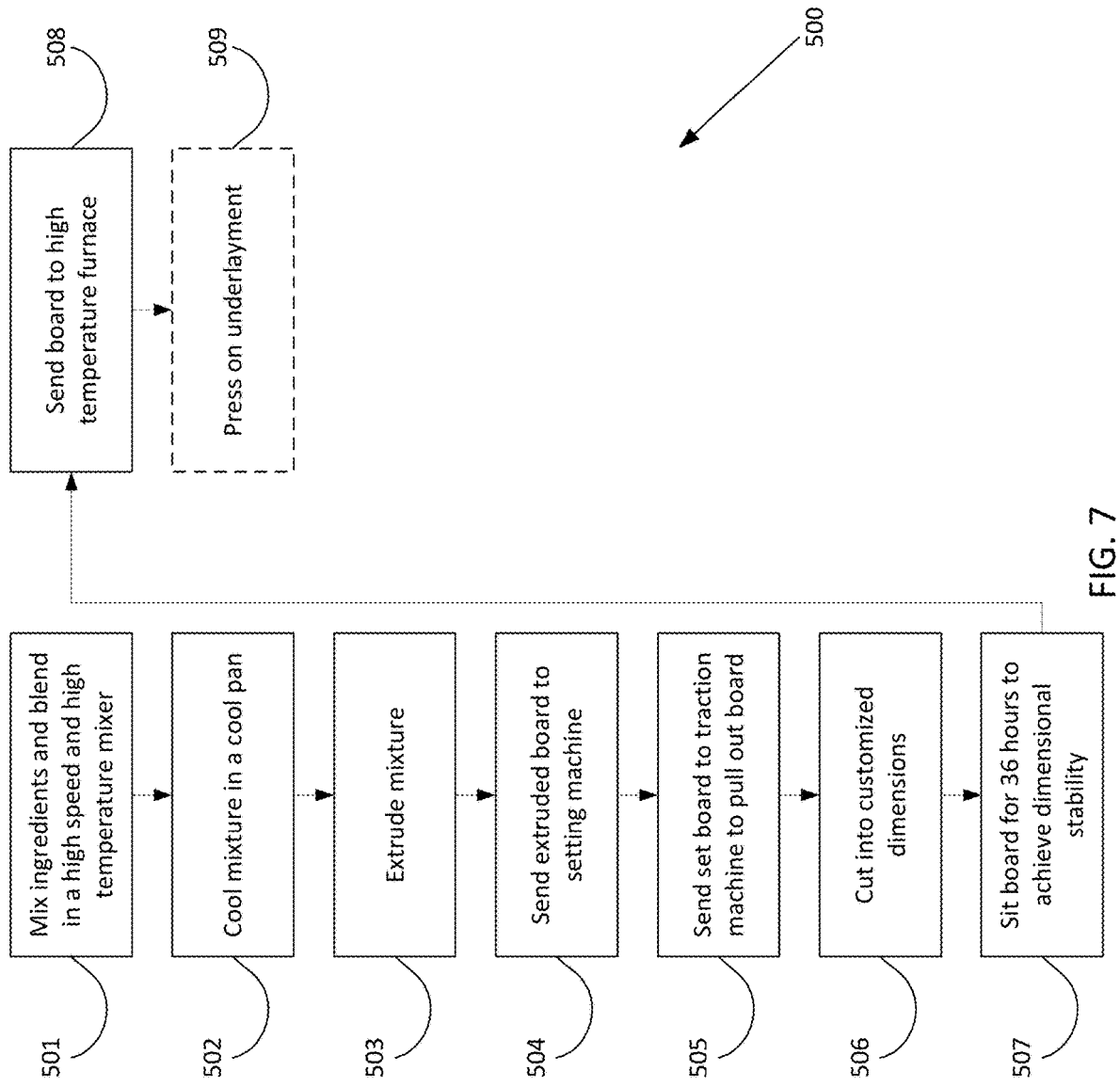
FIG. 7 provides a flow chart diagram for a method of producing an extruded board product according to the present invention.

With respect now to FIG. 7, a flowchart 500 describing an exemplary embodiment of a manufacturing process for the new wallboard is provided. In step 501, the ingredients are mixed and blended in a high speed & high temperature mixer at around 120° C. for 15-20 minutes. At step 502 the mixture is cooled to around 38-42° C. in a cool pan (e.g., using 15-20° C. circulating water to cool the mixture down rapidly). The cooling process may take from 15 to 20 minutes. After the mixture has cooled, in step 503 the mixture is extruded, for example, in a screw extruder having six screw zones which have 5 different temperature zones. This raises the temperature and allows the mixture to become sheared and plasticized while being extruded. The zones in the extruder may have the following exemplary properties, with the indicated temperatures being approximate temperatures for each zone: zone 1: 178-185° C.; zone 2: 175-182° C.; zone 3: 168-170° C.; zone 4: 168° C.; zone 5: 165° C. When the mixture being extruded reaches zone 5, the mixture will be completely plasticized and well distributed. After being extruded the mixture is sent to a setting machine in step 504. The temperature of the setting machine mold is around 170-175° C. which is best for the foaming agents. After setting, the extruded and set board is sent to the traction machine to pull out the wallboard to a final length and thickness in step 505. At step 506, the wallboard is cut into desired dimensions in a cutting machine. Then at step 507 the raw wallboard will set or rest for 36 hours, so the product will become dimensionally stable. Dimensional stability is usually achieved at around 24 hours at which point the wallboard has contracted and/or expanded. In step 508 the now dimensionally stable wallboard is sent to a high temperature furnace and is gradually heated to around 140-160° C. for approximately 160-180 seconds depending on the thickness of product. For a 4.8 mm thick board the curing time in the furnace is 190 seconds and for a 4.0 mm thick board the curing time is 150 seconds. This step ensures the stability of the wallboard. At this stage, the ammonia contained in the foaming agent will be volatilized. Finally, in optional step 509 using a glue, with high pressure rollers, a magnetic underlayment is pressed onto the finished wallboard for a wallboard that will be used in a magnetic box system as the substrate for a wall. In this manner SCRM-based wall covering units may be placed over the magnetized wallboard.

Lightweight Stone/Hybrid Floor Covering:

With reference now to FIGS. 3-6 side cross-section and top perspective views of embodiments of a lightweight stone/hybrid floor covering 300 comprising a thin cut stone veneer top layer 320, a shock absorbing core layer 330 with a thickness 331, and with an optional SCRM-based or magnetically receptive magnetically receptive layer 340 according to the present invention are provided. Natural marble, travertine, quartz, granite, and any other stone products used in floor covering are typically are 2 cm thick because they are a porous in nature and must be thick to absorb shocks, so they do not crack. The present invention uses a multi-layer construction to provide a lightweight stone/hybrid floor covering unit 300 comprised of the thin cut stone veneer layer 320 and the shock absorbing core layer 330. Existing core layers used in other flooring types, such as vinyl and engineered wood flooring, are very thick and are not of a suitable composition or density to be used with a thin cut stone veneer layer 320. The shock absorbing core layer 330 of the present invention has a hardness and a specific gravity matched to the thin cut stone veneer layer 320. No existing back or substrate can be applied to a thin cut stone veneer layer 320 to prevent cracking. However, the shock absorbing core layer 330 of the present invention has a specific gravity that matches that of the thin cut stone veneer layer 320, thereby effectively transferring stresses and shocks through the thin cut stone veneer layer 320 to the shock absorbing core layer 330 and to a supporting surface such as a floor, joist, wall, etc. Shock absorbing core layer 330 may be configured or adapted to provide density or specific gravity that accommodates a range of densities or specific gravities for a variety of stone veneers and thicknesses. "Matching" refers to adapting the core/receptive layer composite components to have a desired ratio of density or specific gravity to the stone veneer layer thickness.

Existing core layers, such as wood plastic composites and stone composites, have a specific gravity of 1.20 to approximately 2. The shock absorbing core layer 330 of the lightweight stone/hybrid floor covering 300 of the present invention has a specific gravity of over 2.5. When paired with a magnetically receptive layer 340, such as a SCRM layer, the combined specific gravity of the shock absorbing core layer 330 and magnetically receptive layer 340 is over 4.8. The specific gravity of the combination of the shock absorbing core layer 330 and the magnetically receptive layer 340 is preferably in equilibrium with the specific gravity of the thin cut stone veneer layer 320. The equilibrium of densities is achieved though the materials used in the shock absorbing core layer 330 combined with the magnetically receptive layer 340. The use of the magnetically receptive layer 340 may reduce the amount of raw materials that need to be used in all flooring types because of its high specific gravity.

Existing core layers can be used with some top layer or veneer types but are typically used in floor coverings such as luxury vinyl tile. Products such as CoreTech cannot be used with stone and would promote cracking or fracturing of a thin cut stone veneer top layer 320. The shock absorbing core layer 330 of the present invention provides an equilibrium or matching of specific gravities between the thin cut stone veneer layer 320 and the shock absorbing core layer 330. The shock absorbing core layer 330 may be manufactured from stone dust byproducts from the cutting of the thin cut stone veneer top layer 320 to more closely match specific gravities and to reduce waste products in the manufacturing process. The Mesh size of the stone dust used in manufacturing the shock absorbing core layer 330 is very fine to increase the specific gravity of the shock absorbing core layer.

Closely matching the specific gravities of the thin cut stone veneer layer 320 and the shock absorbing core layer 330 is required to prevent cracking or chipping of the thin cut stone veneer layer 320. A perfect equilibrium is not required, but the specific gravities of the two layers preferably are substantially similar. Some stone or mineral types for the thin cut stone veneer layer 320 require a higher degree of similarity in specific gravities to the shock absorbing core layer 330 than other types. The thickness of the shock absorbing core layer 330 can also change the specific gravity and shock absorbing properties. A thicker shock absorbing core layer 330 provides for a greater transfer of energy from the thin cut stone veneer layer 320 to the shock absorbing core layer 330, thereby dispersing more of any impact shocks.

The top layer of the lightweight stone/hybrid floor covering 300 is a thin cut stone veneer or a thin ceramic layer 320. A specific speed and temperature are not required to cut a thin cut stone veneer layer 320 from a larger block or piece of stone raw material. The raw material is a large block of stone that has been cut down to a workable width in the rough but is very thick—over a meter thick. It is then put on a commercial water jet cutting system to be cut to a thin cut stone veneer layer 320 approximately ⅛" thick. The thin cut stone veneer layer 230 is then fine cut on the edges using a water jet and is industrially polished. The thin cut stone veneer layer 320 is now a blank and will form the first layer of the lightweight stone/hybrid floor covering 300 comprising a shock absorbing core layer 330. A slurry of raw material ceramic may be molded/heated and processed through a normal ceramic making process but cut as a veneer layer of approximately ⅛" thick and utilized as described.

The second or middle/core layer is a shock absorbing core layer 330. The shock absorbing core layer 330 may be comprised of different raw materials. The shock absorbing core layer 330 may be manufactured or produced using the same process used in making the wallboard 100 and as shown in FIG. 7. The shock absorbing core layer 330 may not comprise basalt casting powder as the primary material used in the wallboard 100. Materials such as stone dust from the cutting of the stone are desirable as a primary material for the shock absorbing core layer 330 as the stone dust would have a specific gravity in equilibrium with the thin cut stone veneer layer 320. Other materials such as limestone, calcium carbonate, magnesium, wood dust, PVC dust, any other suitable raw materials may be used to manufacture the shock absorbing core layer using the extrusion method as described in the wallboard process 500. Similar formulas may be used to produce the shock absorbing core layer 330 and the wallboard 100. For example, the wallboard formulas, shown in Tables 3-5, may be used and the basalt casting powder may be substitute for waste stone that has been pulverized further to a finer Mesh consistency that is desired for the shock absorbing core layer 330. The shock absorbing core layer 330 is dimensionally stable and has a specific gravity of 2.0 to 4.0. The specific gravity is the material's mass per unit volume and is measured in kg/m3. Most stone/natural stone/ceramics have a specific gravity between 2.0 and 3.0 (e.g., quartz=2.72, granite=2.75).

The purpose of the shock absorbing core layer 330 is to act as a shock absorber that can transfer a "shock" received in the first layer, the thin cut stone veneer layer 320, such as dropping a tool on the lightweight stone/hybrid floor covering 300 to the secondary layer 330 that is able to disperse the shock. The shock absorbing core layer 330 substantially increases the ability of the thin cut stone veneer first layer 320 to be able to resist shocks that would normally break or crack the lightweight stone/hybrid floor covering unit 300. The shock absorbing core layer 330 is much lighter than the stone that it is replacing. Typically, the shock absorbing core layer 330 will be approximately 5.0 mm in thickness. Traditional solid stone thicknesses are 2 cm and thicker, making the cost prohibitive to many consumers and causing stone flooring to only be available to a "high end" market. The lightweight stone/hybrid floor covering unit 300 uses only a veneer of the same stone, the thin cut stone veneer layer 320, that has high resistance to cracking. The lightweight stone/hybrid floor covering unit 300 reduces the raw material stone used by ¾ inch or more. The reduction in the amount of raw material stone used reduces the price of the overall floor covering and reduces the shipping weight due to the heaviness of the raw material stone/ceramic. The reduction in the thickness also reduces the likelihood of cracking during installation and transport.

The first layer, the thin cut stone veneer layer 320, is bonded to the secondary shock absorbing core layer 330 in a cold press manufacturing process using industrial resin/epoxy glue and pressure. In this manner, the two layers are permanently bonded together and can typically provide a high resistance to stress or loads, about 35 or 40 MPa.

A third layer may also be used. The third layer is a magnetically receptive layer 340 or SCRM layer. The magnetically receptive layer 340, when combined with the thin cut stone veneer layer 320 and shock absorbing core layer 330 of the lightweight stone/hybrid floor covering 300 provides for the use in an interchangeable box system. An interchangeable box system is a system that uses magnetic sheet good layers secured to supporting surfaces to provide for the quasi-permanent attachment of magnetically receptive surface covering units, such as the lightweight stone/hybrid floor covering unit 300. The magnetically receptive layer 340 is bonded to the shock absorbing core layer 330 using an industrial resin/epoxy glue and pressure in a cold press application, or by any other suitable bonding mechanism. Combining the underlayment third layer 340 to the lightweight stone/hybrid floor covering unit 300 provides for the quasi-permanent installation of the lightweight stone/hybrid floor covering unit 300 on a supporting surface with a magnetic underlayment layer installed and does away with having to use destructive and permanently bonded cementitious materials between the substrate and the flooring/wall unit. Additionally, when using the interchangeable box system, the magnetically receptive layer 340 (along with the opposite magnetic underlayment) acts as a waterproof membrane, something highly desirable and typically required when installing stone/ceramic products in wet areas (e.g., bathrooms, kitchens etc.) and there is a need for waterproofing. Instead of using a sanded grout between the lightweight stone/hybrid floor covering units 300, a non-sanded acrylic grout or the like may be used and will enable the quick and nondestructive abatement of an existing installation saving an enormous amount of time and the provide for the "repurposing" of the old removed lightweight stone/hybrid floor covering unit 300.

A thickness of 5/16" is a cost-effective thickness of the shock absorbing core layer 330 that improves cost effectiveness when compared to traditional stone floorings but is based on using a magnetically receptive layer 340. Additional thickness of the shock absorbing core layer 330 would be required without a magnetically receptive layer 340. An 0.3 mm thick magnetically receptive layer 340 with a 5/16" thick shock absorbing core layer 330 is sufficient to provide specific gravity equilibrium to the shock absorbing core layer 330 and thin cut stone veneer layer 320 combination.

Specific gravity is additive. For example, a thin cut stone veneer layer 320 of 3.174 mm to 5 mm thick will have a specific gravity of 2-4, and a shock absorbing core layer 330 that is 6 mm thick with a specific gravity of 1.5-2.0 may be used with a magnetically receptive layer 340 that is 0.3 mm thick with a specific gravity of 4.6 to achieve equilibrium in specific gravities. Typically, the thickness of the shock absorbing core layer 330 can be reduced by at least the thickness of the magnetically receptive layer 340 to maintain a specific gravity equilibrium between the shock absorbing core layer 330, the magnetically receptive layer 340, and the thin cut stone veneer layer. Alternatively, thickness of the shock absorbing core layer 330 can remain the same when the magnetically receptive layer 340 is added, and the hardness of the stone in the thin cut stone veneer layer 320 can increase. The total thickness of shock absorbing core layer 330, magnetically receptive layer 340, and thin cut stone veneer layer 320 is approximately 9 mm. The laminated magnetically receptive layer 340 and shock absorbing core layer 330 is denser than the shock absorbing core layer alone.

With respect to the composition of the shock absorbing core layer 330, plasticizers, foaming agents, and binding compounds do not appreciably affect the density of the shock absorbing core layer 330. Stone dust comprises 30-40% of material in the shock absorbing core layer 330 and has properties similar to glues or adhesives—it "wants" to bond to other things when wet. 10-15% of the shock absorbing core layer comprises foaming agents/binders which bind the material together. Foaming agents are more critical for CO3 and less is required with limestone. However, too much foaming agent and CO3 will never properly bond together. The remaining mass of the shock absorbing core layer is largely filler material.

In one embodiment, the present invention provides an extruded, dimensionally stable board product comprising: a primary material; a filler material; a foaming agent; a stabilizer; and a binding material. The primary material may be basalt casting powder. The primary material may be stone dust. The board product may be formed by: mixing the primary material, the filler material, the foaming agent, the stabilizer, and the binding material in a high speed and high temperature mixer to form a mixture; cooling the mixture in a cooling pan; extruding the mixture to form an extruded product; setting the extruded product in a setting machine; pulling the set extruded product in a traction machine to pull out the extruded product to a desired length and thickness; cutting the set and pulled extruded product into a desired final size to form a final board product; resting the final board product; and curing the final board product in a furnace. The board product may have a specific gravity of 2.0-4.0.

In another embodiment, the present invention provides a lightweight hybrid floor covering unit, the floor covering unit comprising: a thin cut stone veneer top layer; and a shock absorbing core layer having a specific gravity in equilibrium with the thin cut stone veneer top layer. The shock absorbing core layer may be a dimensionally stable board product comprising: a primary material; a filler material; a foaming agent; a stabilizer; and a binding material. The primary material may be stone dust. The floor covering unit may further comprise an underlayment layer. The underlayment layer may be a magnetically receptive sheet good. The specific gravity of the underlayment layer and the shock absorbing core layer may be in equilibrium with the thin cut stone veneer top layer. The underlayment layer may have a specific gravity higher than the specific gravity of the shock absorbing core layer. The thin cut stone veneer top layer may be pressed to the shock absorbing core layer and may be secured by an adhesive. The shock absorbing core layer may be pressed to the underlayment layer and may be secured by an adhesive. The floor covering unit may further comprise: wherein the thin cut stone veneer top layer has a specific gravity of 2.0-3.0; and wherein the shock absorbing core layer has a specific gravity of 2.0-4.0. The floor covering unit may further comprise: wherein the thin cut stone veneer top layer has a specific gravity of 2.0-3.0; and wherein the shock absorbing core layer and the underlayment layer have a specific gravity of 2.0-4.0, with the underlayment layer having a relatively higher specific gravity than the shock absorbing core layer.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. An extruded, dimensionally stable board product comprising:
   a primary material comprised of water-insoluble, non-fibrous stone powder or dust;
   a filler material;
   a foaming agent;
   a stabilizer comprising calcium zinc; and
   a binding material;
   wherein the board product is formed by mixing the primary material, the filler material, the foaming agent, the stabilizer, and the binding material in a high speed and high temperature mixer to form a mixture, and extruding the mixture to form an extruded product; and
   wherein the board product has a specific gravity of between 2.0 and 4.0; and
   wherein the board product further comprises:
   at least 45% of the binding material;
   at least 15% of the filler material;
   at least 30% of the primary material;
   at least 0.5% of the foaming agent; and
   at least 2% of the stabilizer.

2. The board product of claim 1, wherein the primary material is basalt casting powder.

3. The board product of claim 1, wherein the primary material is one of stone dust, magnesium, wood dust, or PVC dust.

4. The board product of claim 1, wherein the board product is formed by:
   mixing the primary material, the filler material, the foaming agent, the stabilizer, and the binding material in a high speed and high temperature mixer to form a mixture;
   cooling the mixture in a cooling pan;
   extruding the mixture to form an extruded product;
   setting the extruded product in a setting machine;
   pulling the set extruded product in a traction machine to pull out the extruded product to a desired length and thickness;

cutting the set and pulled extruded product into a desired final size to form a final board product;
resting the final board product; and
curing the final board product in a furnace.

5. The board product of claim 1, wherein the board product further comprises:
the binding material comprising:
at least 30% of a first binding material; and
at least 15% of a second binding material.

6. The board product of claim 1, wherein the board product further comprises:
at least 4% of a foaming agent regulator.

7. The board product of claim 1, wherein the board product further comprises:
at least 0.5% of a lubricant.

8. The board product of claim 1, wherein the primary material further comprises:
a first primary material having a first mesh size; and
a second primary material having a second mesh size.

9. A lightweight hybrid floor covering unit, the floor covering unit comprising:
a thin cut stone veneer top layer having a first specific gravity and a thickness of approximately 0.125 inch or less; and
a shock absorbing core layer comprised of non-fibrous stone powder or dust and having a second specific gravity in equilibrium with the first specific gravity of the thin cut stone veneer top layer;
wherein each of the first specific gravity and the second specific gravity represents the density of each respective layer relative to a baseline material;
wherein the first specific gravity of the thin cut stone veneer top layer and the second specific gravity of the shock absorbing core layer are closely matched to prevent cracking and damage to the thin cut stone layer normally associated with wear, impacts and shocks; and
wherein the combined thin cut stone veneer top layer and shock absorbing core layer result in the floor covering unit having a specific gravity of 2.0 to 4.0; and
wherein the shock absorbing core layer is a dimensionally stable board product comprising:
a primary material;
a filler material;
a foaming agent;
a stabilizer; and
a binding material; and
wherein the dimensionally stable board product further comprises:
at least 45% of the binding material;
at least 15% of the filler material;
at least 30% of the primary material;
at least 0.5% of the foaming agent; and
at least 2% of the stabilizer.

10. The floor covering unit of claim 9, wherein the primary material is stone dust.

11. The floor covering unit of claim 9, further comprising an underlayment layer.

12. The floor covering unit of claim 11, wherein the underlayment layer is a magnetically receptive sheet good.

13. The floor covering unit of claim 9, further comprising a magnetized sheet good layer.

14. The floor covering unit of claim 11, wherein the specific gravity of the underlayment layer and the shock absorbing core layer is in equilibrium with the thin cut stone veneer top layer.

15. The floor covering unit of claim 13, wherein the specific gravity of the magnetized sheet good layer and the shock absorbing core layer is in equilibrium with the thin cut stone veneer top layer.

16. The floor covering unit of claim 11, wherein the underlayment layer has a specific gravity higher than the specific gravity of the shock absorbing core layer.

17. The floor covering unit of claim 9, wherein the thin cut stone veneer top layer is pressed to the shock absorbing core layer and is secured by an adhesive.

18. The floor covering unit of claim 11, wherein the shock absorbing core layer is pressed to the underlayment layer and is secured by an adhesive.

19. The floor covering unit of claim 9, further comprising:
wherein the thin cut stone veneer top layer has a specific gravity of 2.0-3.0; and
wherein the shock absorbing core layer has a specific gravity of 2.0-4.0.

20. The floor covering unit of claim 11, further comprising:
wherein the thin cut stone veneer top layer has a specific gravity of 2.0-3.0; and
wherein the shock absorbing core layer and the underlayment layer have a specific gravity of 2.0-4.0, with the underlayment layer having a relatively higher specific gravity than the shock absorbing core layer.

21. The floor covering unit of claim 9, wherein the dimensionally stable board product further comprises:
the binding material comprising:
at least 30% of a first binding material; and
at least 15% of a second binding material.

22. The floor covering unit of claim 9, wherein the dimensionally stable board product further comprises:
at least 4% of a foaming agent regulator.

23. The floor covering unit of claim 9, wherein the dimensionally stable board product further comprises:
at least 0.5% of a lubricant.

24. The floor covering unit of claim 9, wherein the primary material further comprises:
a first primary material having a first mesh size; and
a second primary material having a second mesh size.

* * * * *